United States Patent [19]

Scheuneman

[11] 4,070,706
[45] Jan. 24, 1978

[54] PARALLEL REQUESTOR PRIORITY DETERMINATION AND REQUESTOR ADDRESS MATCHING IN A CACHE MEMORY SYSTEM

[75] Inventor: James Herman Scheuneman, St. Paul, Minn.

[73] Assignee: Sperry Rand Corporation, New York, N.Y.

[21] Appl. No.: 724,681

[22] Filed: Sept. 20, 1976

[51] Int. Cl.² ................................................. G06F 9/18
[52] U.S. Cl. .................................................... 364/200
[58] Field of Search ......................................... 364/200

[56] References Cited

U.S. PATENT DOCUMENTS

| | | | |
|---|---|---|---|
| 3,699,530 | 10/1972 | Capowski et al. | 340/172.5 |
| 3,812,473 | 5/1974 | Tucker | 340/172.5 |
| 3,896,419 | 7/1975 | Lange et al. | 340/172.5 |
| 3,938,097 | 2/1976 | Niguette | 340/172.5 |

*Primary Examiner*—Gareth D. Shaw
*Assistant Examiner*—C. T. Bartz
*Attorney, Agent, or Firm*—Kenneth T. Grace; Marshall M. Truex; William E. Cleaver

[57] ABSTRACT

A method of and an apparatus for performing, in a Cache memory system, the Priority determination of what Requestor, of R Requestors, is to be granted priority by the Priority Network while simultaneously comparing, in parallel, all of the R Requestors' addresses for a Match condition in R Cache memories. The Cache memory system incorporates a separate Cache memory or associative memory for each Requestor, each of which Cache memories is comprised of an Address Buffer or Search memory, in which the associated Requestors' addresses are stored, and a Data Buffer or Associated memory, in which the data that are associated with each of the Requestors' addresses are stored. Thus, while the Priority Request signals from all of the requesting Requestors are being coupled to the single Priority Network, each of the requesting Requestors' addresses is coupled to each of the requesting Requestor separately associated Cache memory. As the Priority determination by the Priority Network and the Match determination by the Cache memories require approximately the same time to complete, the parallel operation thereof substantially reduces memory access time to either the Main memory or the Cache memory.

3 Claims, 14 Drawing Figures

PARALLEL REQUESTOR PRIORITY DETERMINATION AND REQUESTOR ADDRESS MATCHING IN A CACHE MEMORY SYSTEM

BACKGROUND OF THE INVENTION

In the prior art it is known to improve the speed or throughput of a data processing system by the use of a relatively high speed, low capacity buffer store called a Cache memory to improve the apparent speed of the relatively low speed, high capacity Main memory or Main Storage Units (MSU). In the Vernon K. Anderson, et al, U.S. Pat. No. 3,967,247, there is disclosed such a system in which a Cache memory is incorporated within a Storage Interface Unit (SIU) that provides the means whereby a plurality of Requestors such as one or more Central Processing Units (CPUs) or Input/Output Units (IOUs) request and obtain access to data that is stored in one or more MSUs. In that system the R Requestors couple their separate Priority Request signals to a single Priority Network while all of the R Requestors couple their separate Requestor address (the address in the MSUs at which the requesting Requestor is seeking to read data from or write data into) to a single Cache memory. The Priority determination is made and then the address of the honored Requestor is gated into the Cache memory for the determination of a Match condition (the determination of whether, vel non, the honored Requestor address is resident in the Cache memory). This serial Priority determination, Match determination adds additional time to the memory access time such that the full, optimum use of the Cache memory system is not obtained. The present invention is directed toward an improvement of such prior art system.

SUMMARY OF THE INVENTION

In the present invention, the SIU provides access for R Requestors to M MSUs, and it includes a single Priority Network and R Cache memories, each separate Cache memory dedicated to only a single associated one of the Requestors. Upon the initiation of each memory cycle, all of the requesting Requestors' Priority Request signals are coupled in parallel into the Priority Network while concurrently each of the requesting Requestors' addresses is coupled to its separately associated Cache memory, with the Match determination conducted in parallel in each of the Cache memories. Thus, the Priority determination and the Match determination are performed in parallel, substantially reducing memory access time over the prior art system.

DESCRIPTION OF THE PREFERRED EMBODIMENT

Figure 1:
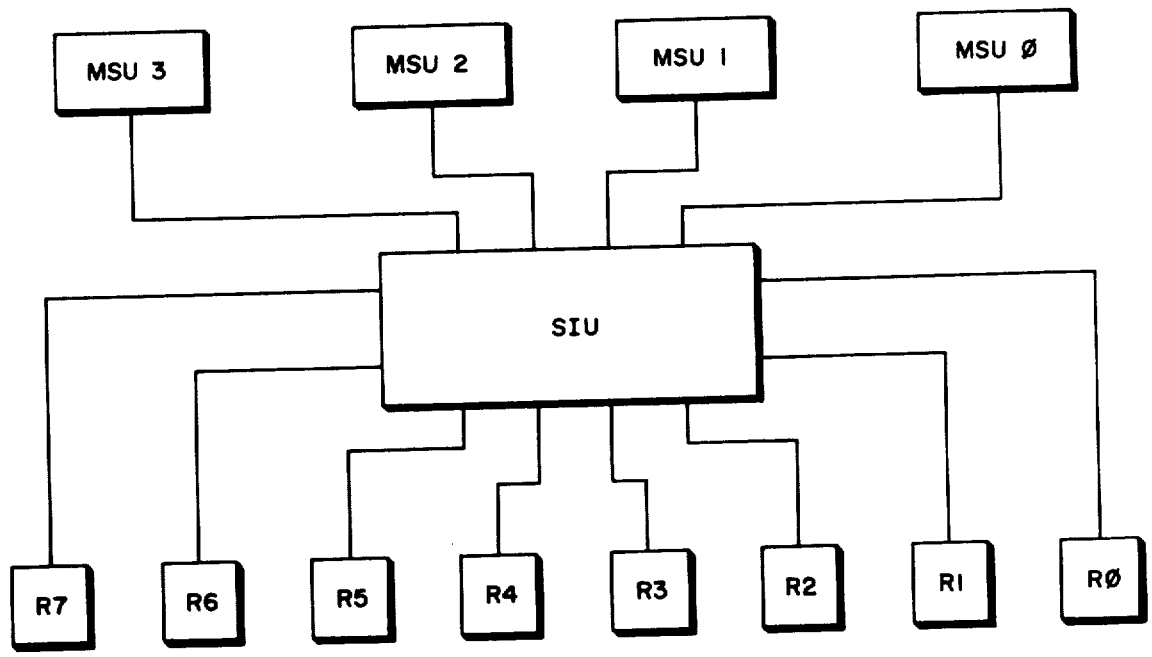
FIG. 1 is a block diagram of a typical data processing system into which the present invention may be incorporated.

With particular reference to FIG. 1 there is presented an illustration of a typical prior art data processing system in which a Storage Interface Unit (SIU) operates to permit a selected one of R = 8, Requestors R$\phi$ - R7 to obtain access to a Main memory comprised of M = 4 Memory Storage Units MSU$\phi$ -MSU3. The SIU includes all of the electronics for the determination of which one of the requesting Requestors is to gain access to data that is stored in its Cache memory system and if such data is not stored in its Cache memory system which one of the M MSUs such data is to be obtained or fetched from for storage in its Cache memory system, all under control of the requesting Requestors. The present invention is directed toward that portion of the SIU that is concerned with the Priority determination of the requesting Requestors and the Match determination of the location, vel non, in the Cache memory system of the honored Requestor's address.

Figure 2:
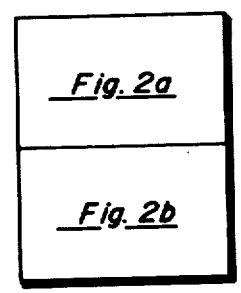
FIG. 2 is a block diagram of a prior art Cache memory system and the associated electronics.
Figure 3:
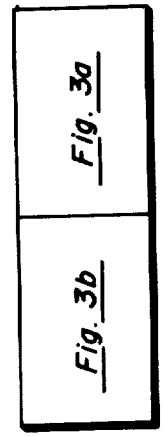
FIG. 3 is a flow diagram of the typical operation of the Cache memory system of FIG. 2.
Figure 4:
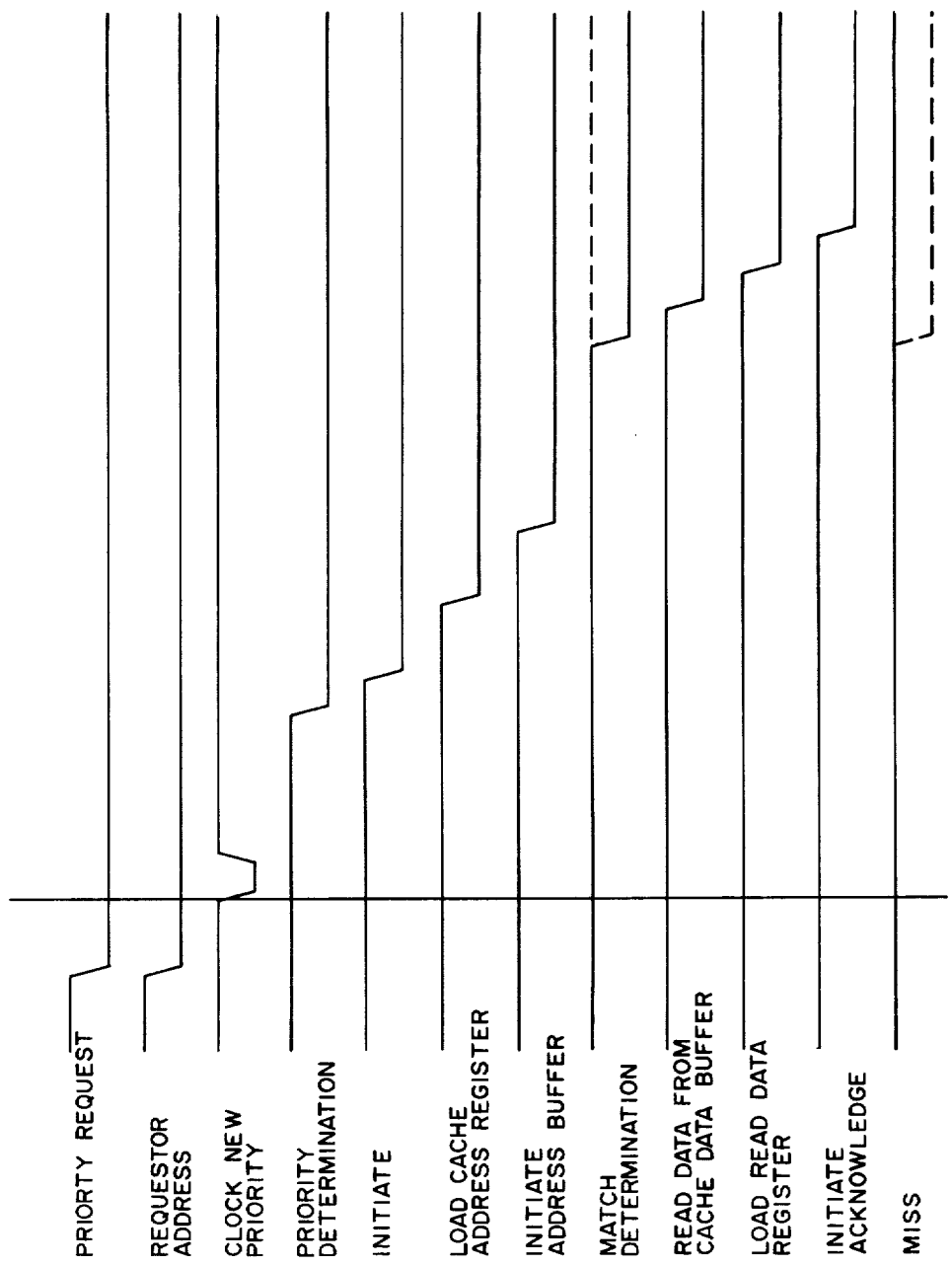
FIG. 4 is a timing diagram of the typical operation of the Cache memory system of FIG. 2.
Figure 5A:
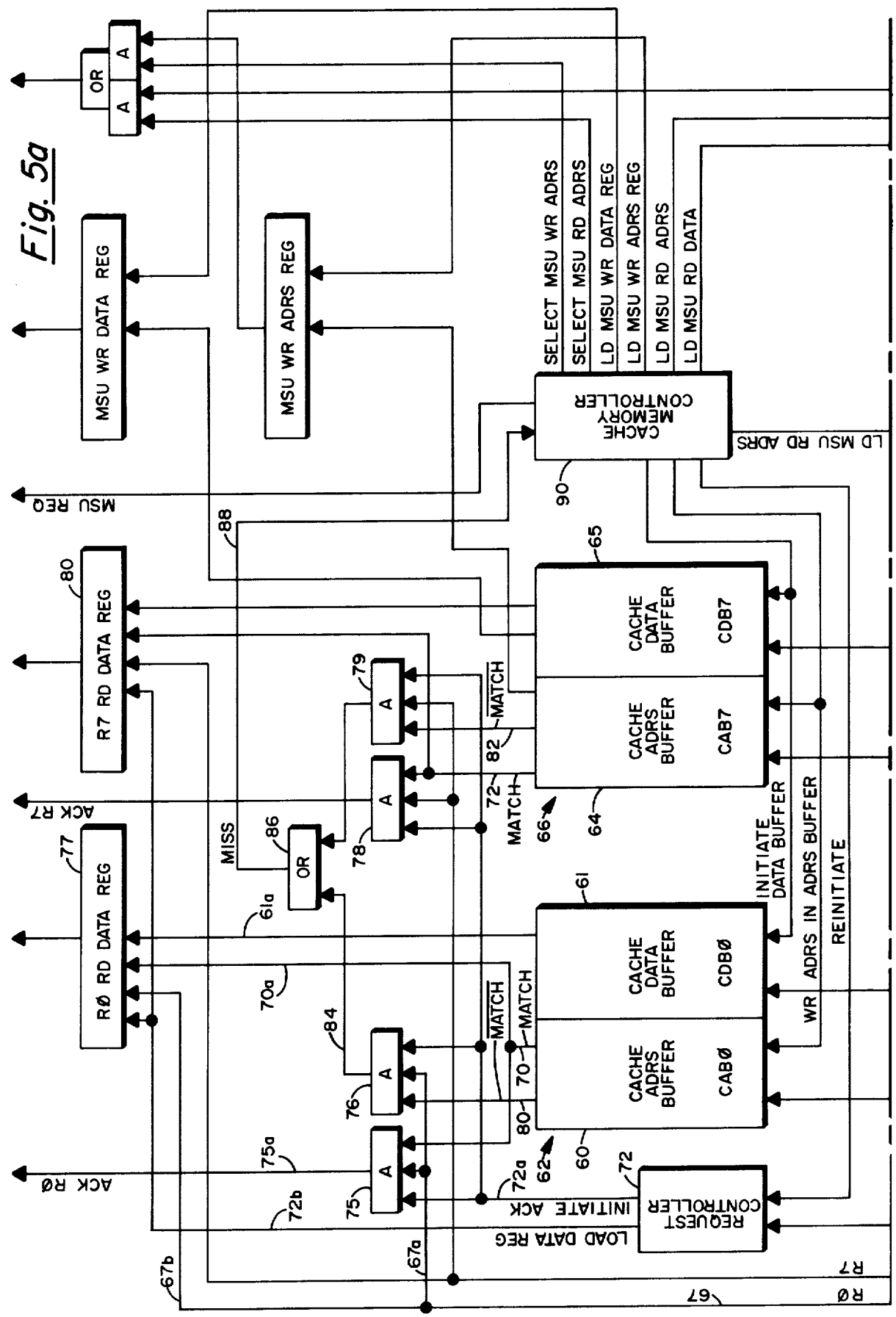
FIG. 5a is a partial block diagram of the Cache memory system and the associated electronics of the present invention.
Figure 5B:
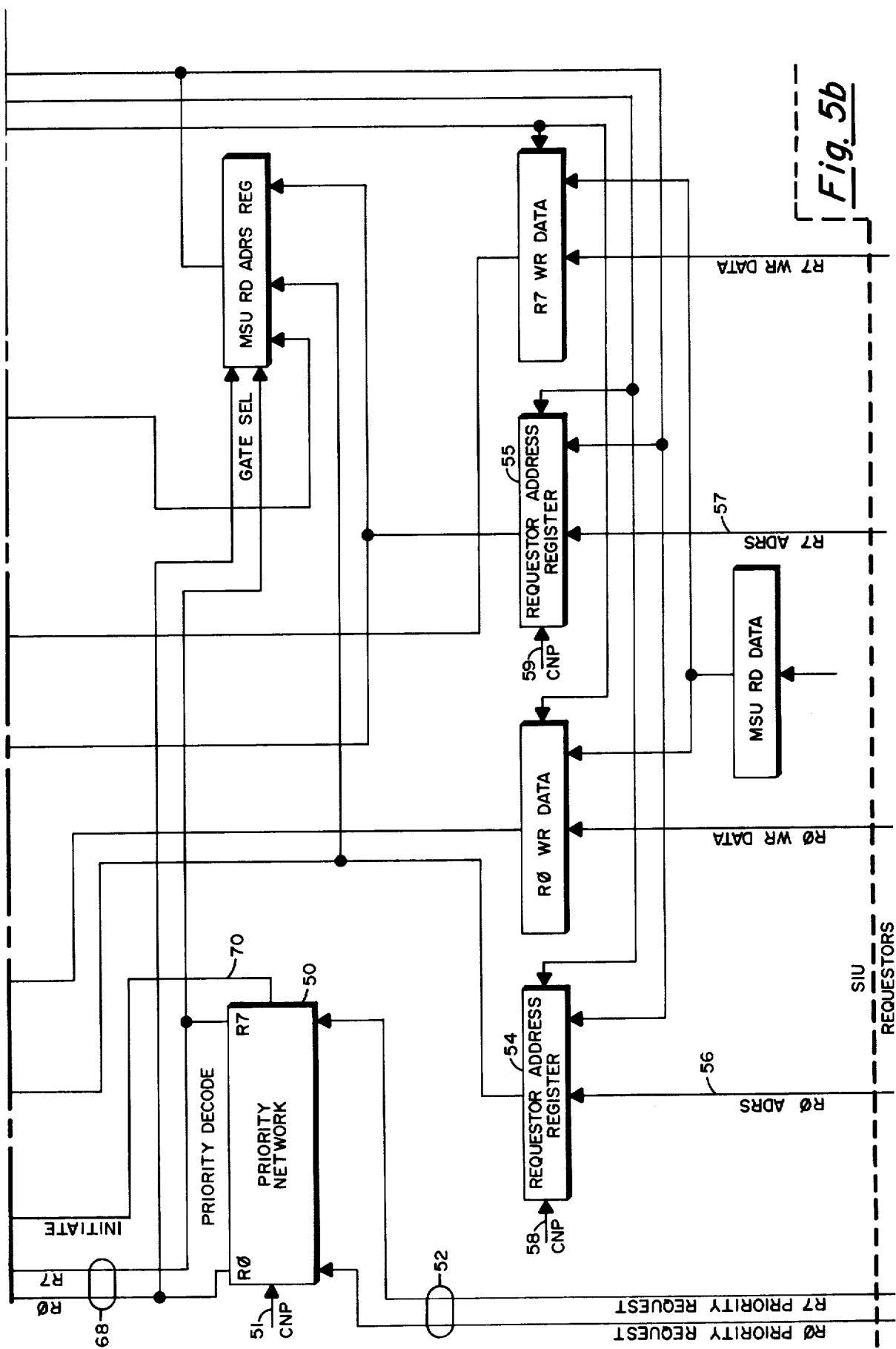
FIG. 5b is a partial block diagram of the Cache memory system and the associated electronics of the present invention.
Figure 6A:
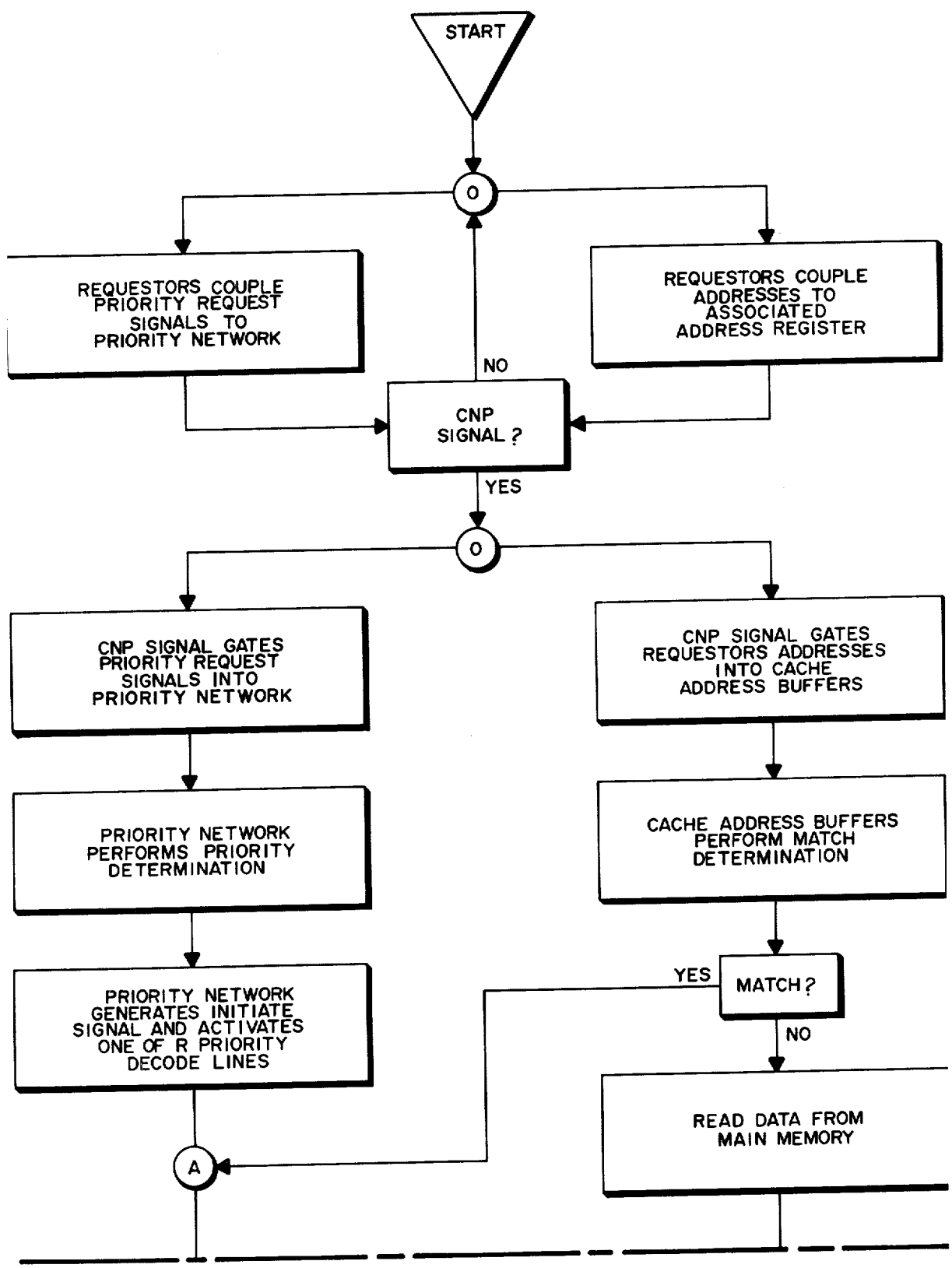
FIG. 6a is a partial flow diagram of the typical operation of the Cache memory system of FIG. 5.
Figure 6B:
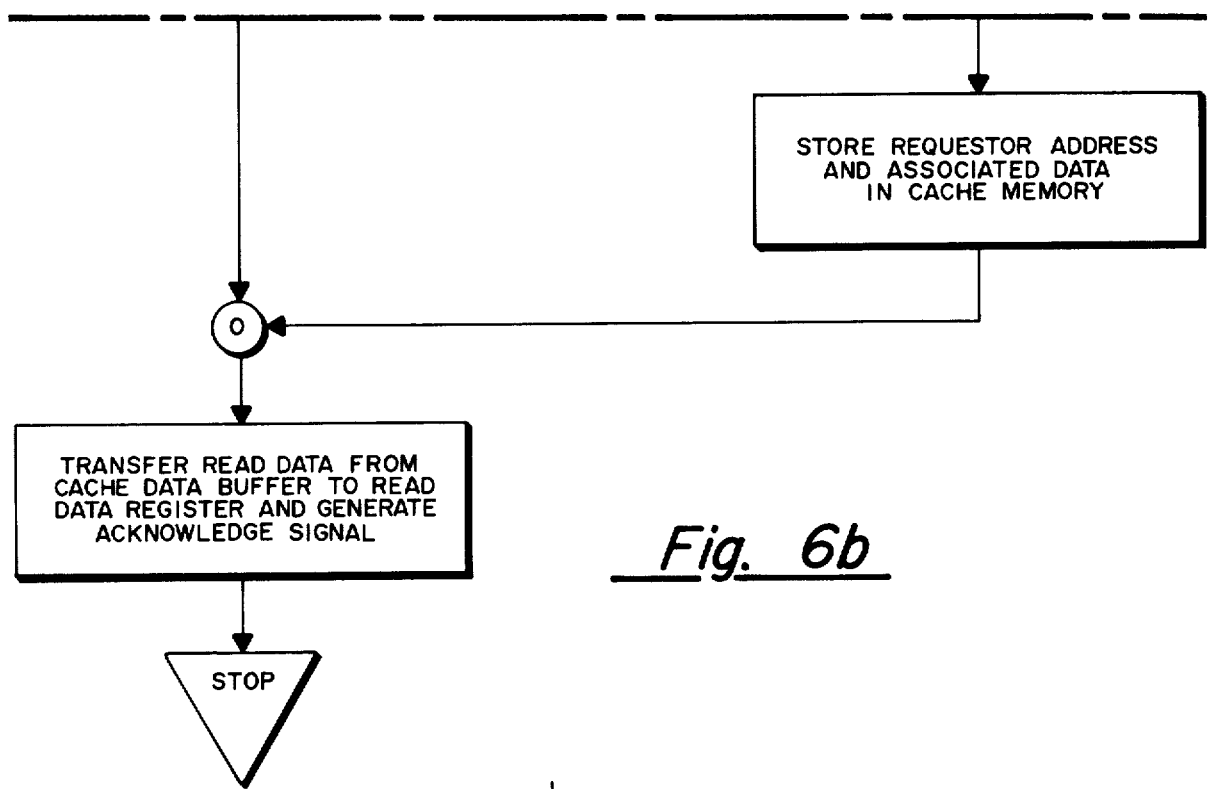
FIG. 6b is a partial flow diagram of the typical operation of the Cache memory system of FIG. 5.

With particular reference to FIG. 2 there is presented a block diagram of a prior art Cache memory system; FIG. 3 is a flow diagram of the typical operation of the Cache memory system of FIG. 2 while FIG. 4 is a typical timing diagram therefore. Initially, the requesting Requestors are coupling their Priority Request signals to Priority Network (PN) 10 via one of their associated wires of cable 12, while concurrently the requesting Requestors are also coupling their Requestor addresses to the associated Requestor Address Registers (RAR) 14, 15 via their associated cables 16, 17, respectively. For the initiation of the memory cycle, the associated data processing system couples a Clock New Priority (CNP) signal to Priority Network 10 via line 11, which CNP signal gates the Priority Request signals on cable 12 into Priority Network 10. Priority Network 10 then performs the Priority determination upon the Priority Request signals coupled to the associated lines of cable 12, the output of which is an active signal coupled to one of the lines of cable 18, which active signal is representative of the honoring of the Priority Request signal of one of the requesting Requestors. Upon the Priority determination of the one Priority Request signal that is to be granted priority, Priority Network 10 generates an Initiate signal which, via line 20 initiates a timing chain in Requestor Controller (RC) 22. Next, the timing chain of Requestor Controller 22 generates a Load Address Register signal that via line 24 gates into Cache Address Register (CAR) 26 the Requestor address from the one Requestor Address Register 14, 15 that is enabled by the active signal in the associated one output line of cable 28 as determined by the associated honored Priority Request Signal in cable 18. Next, the timing chain of Requestor Controller 22 generates an Initiate Address Buffer signal which, via line 30, initiates the Match determination in Cache Address Buffer (CAB) 32 of Cache memory 34 whereby the Requestor address that is held in Cache Address Register 26 is compared to the Requestor addresses that are stored in Cache Address Buffer 32. Cache Address Buffer 32 during the Match determination determines if: a Match condition exists, i.e., that the Requestor address in Cache Address Register 26 matches a Requestor address previously stored in Cache Address Buffer 32, or alternatively; a $\overline{\text{Match}}$ or Miss condition exists, i.e., that the Requestor address in Cache Address Register 26 does not match a Requestor previously stored in Cache Address Buffer 32.

If during the Match determination by Cache Address Buffer 32 a Match condition is determined, Cache Address Buffer 32 generates a Match signal which, via line 36 and the one activated line of cable 18, gates: the associated read data out of the associated content addressable location in Cache Data Buffer (CDB) 33 of Cache memory 34 and into and out of the associated Read Data Register (RDR) 38, 39, respectively; and the associated Acknowledge Signal into and out of the associated Acknowledge AND gate 40, 41 respectively.

If instead of the determination of a $\overline{\text{Match}}$ condition, a Match condition is determined, Cache Address Buffer 32 generates and couples a $\overline{\text{Match}}$ or Miss signal to line 42 which $\overline{\text{Match}}$ signal causes Cache Memory Controller (CMC) 44 to generate the necessary signals that retrieve the sought for data that is stored in the associated address of Main memory, writes the retrieved address and the associated data into the associated portions of Cache Address Buffer 32 and Cache Data Buffer 33, respectively, and reinitiates the Requestor Controller 22 to repeat the Match determination in Cache memory 34—the sought for address and the associated data now being stored or resident in Cache memory 34. FIGS. 3 and 4 graphically illustrate that the time required to perform the Priority determination and the time to perform the Match determination are cumulative or additive providing a longer than optimum memory access time.

Figure 5:
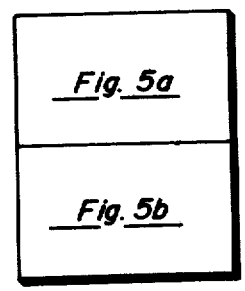
FIG. 5 is a block diagram of the Cache memory system and the associated electronics of the present invention.
Figure 6:
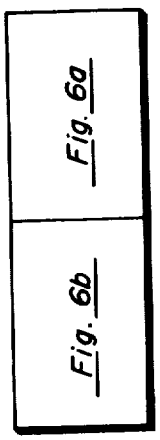
FIG. 6 is a flow diagram of the typical operation of the Cache memory system of FIG. 5.
Figure 2A:
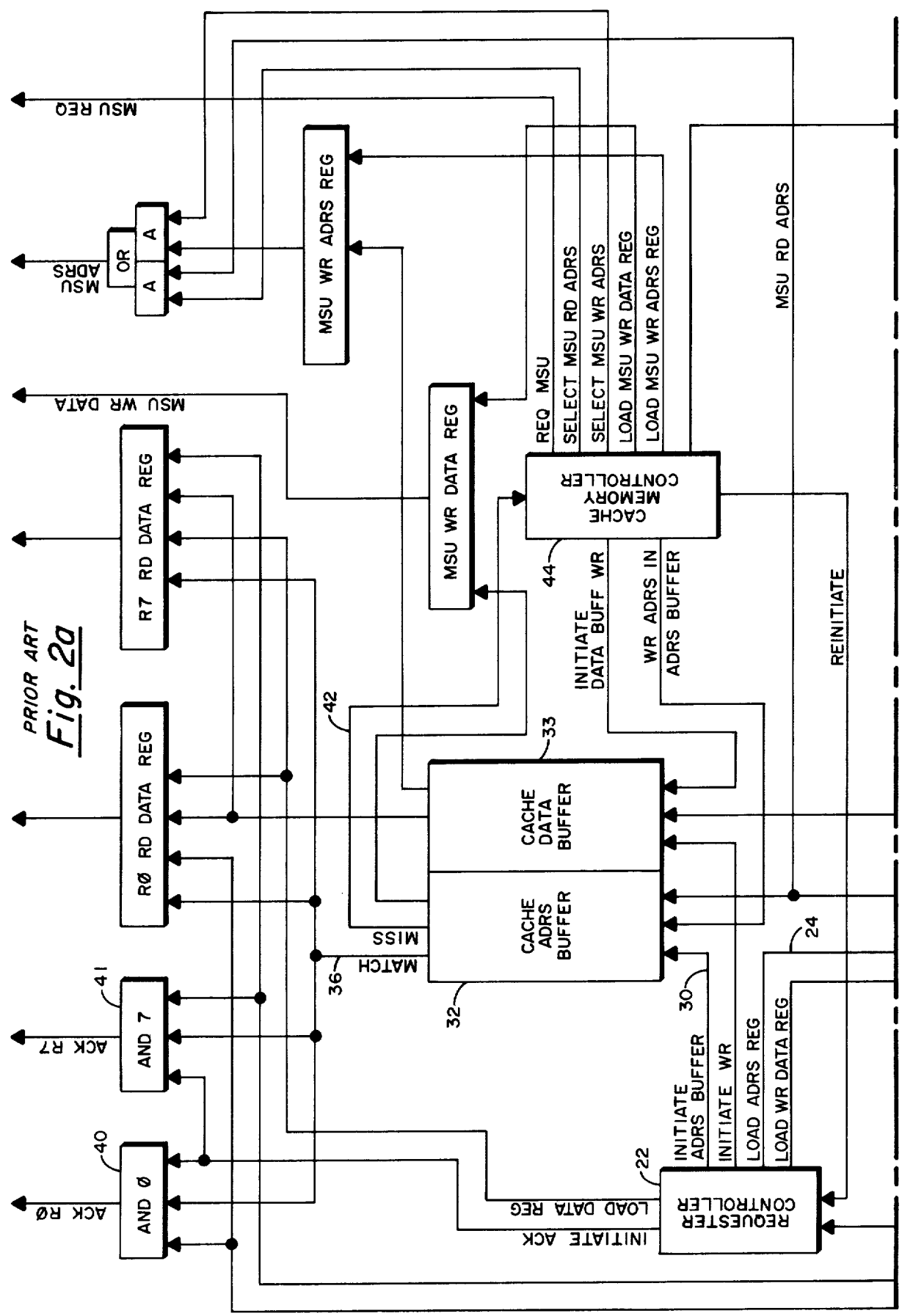
FIG. 2a is a partial block diagram of a prior art Cache memory system and the associated electronics.
Figure 2B:
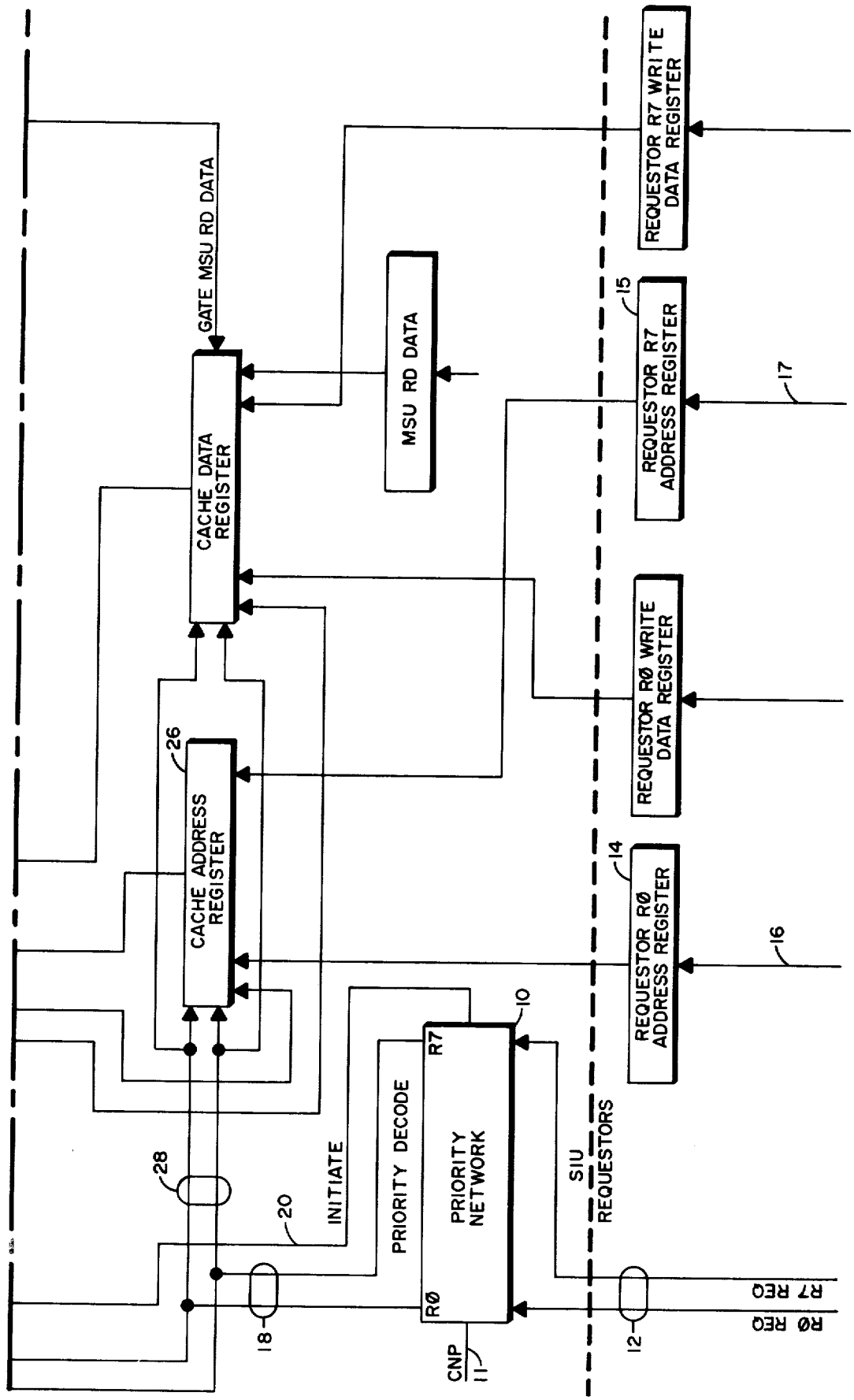
FIG. 2b is a partial block diagram of a prior art Cache memory system and the associated electronics.
Figure 3A:
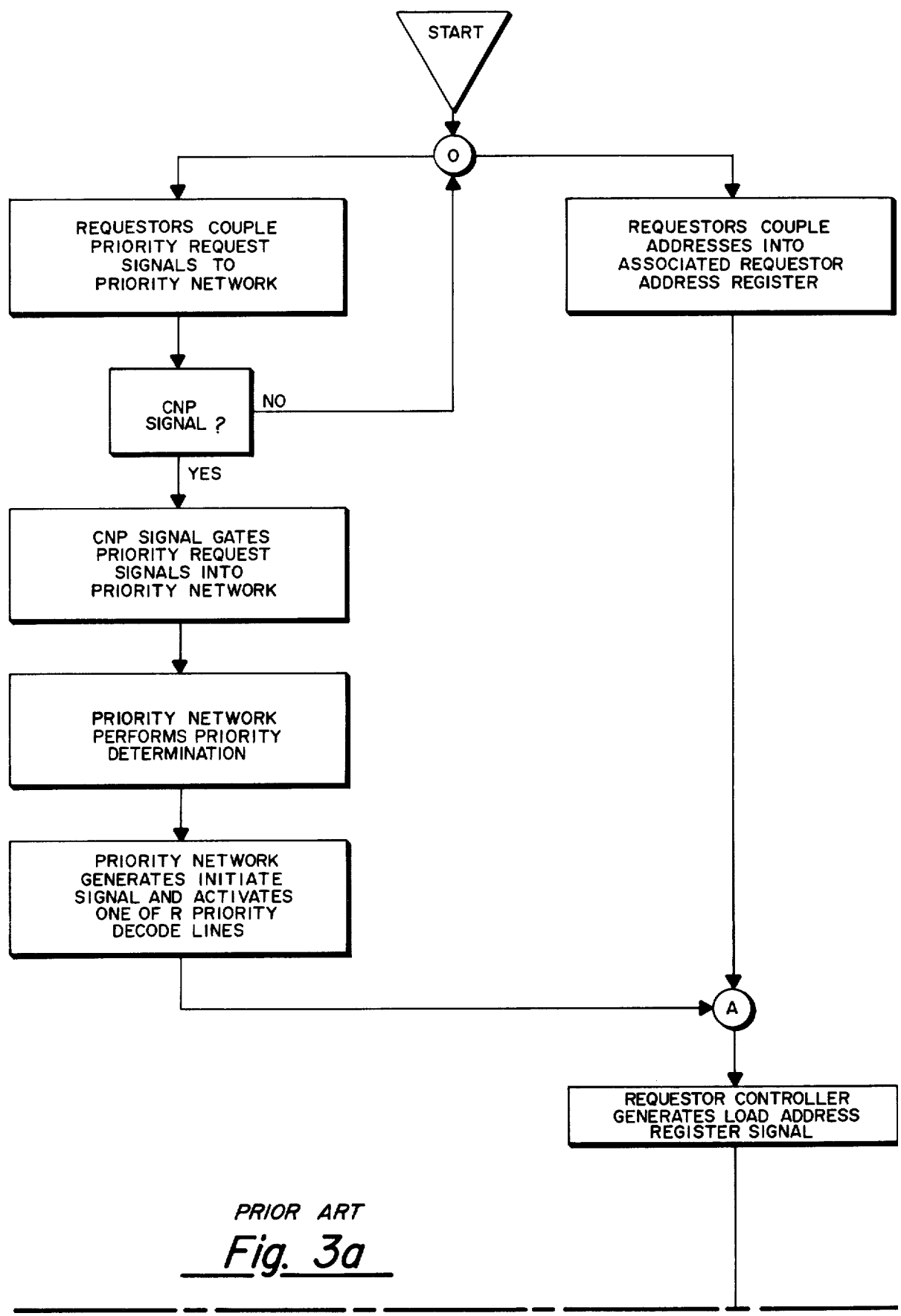
FIG. 3a is a partial flow diagram of the typical operation of the Cache memory system of FIG. 2.
Figure 3B:
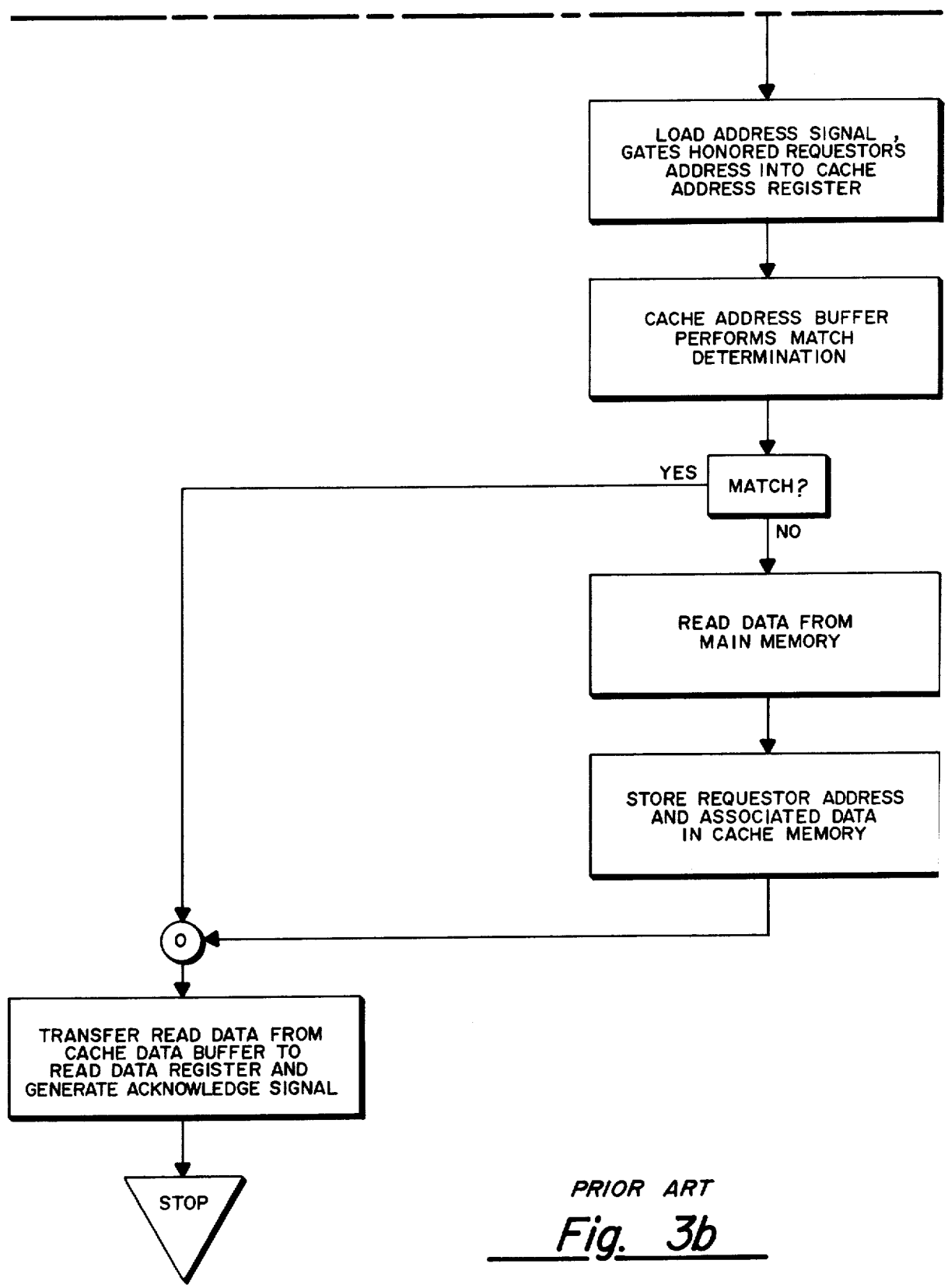
FIG. 3b is a partial flow diagram of the typical operation of the Cache memory system of FIG. 2.
Figure 7:
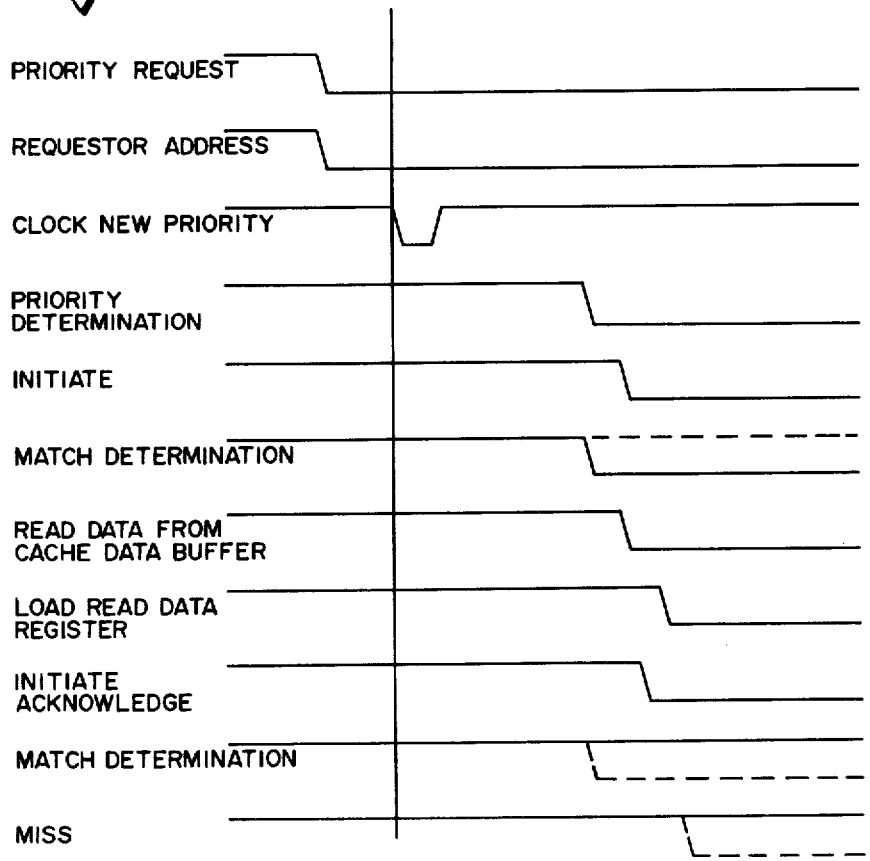
FIG. 7 is a timing diagram illustrating the improved operation of the present invention over that of the prior art system of FIG. 4.

With particular reference to FIG. 5 there is presented a block diagram of the Cache memory system and the associated electronics of the present invention; FIG. 6 is a flow diagram of the typical application of the Cache memory system of FIG. 5 while FIG. 7 is a typical timing diagram therefor. Initially, the requesting Requestors are coupling their Priority Request signals to Priority Network (PN) 50 via one of the associated wires of cable 52, while concurrently the requesting Requestors are also coupling their Requestor addresses to the associated Requestor Address Registers (RAR) 54, 55 via their associated cables 56, 57, respectively.

For the initiation of the memory cycle, the associated data processing system concurrently couples a Clock New Priority (CNP) signal to Priority Network 50 via line 51 and to Requestor Address Registers 54, 55 via lines 58, 59, respectively. The CNP signal concurrently gates the Priority Request signals on cable 52 into Priority Network 50 and the requesting Requestors' Requestor Addresses on cables 56, 57 into the associated Requestor Address Registers 54, 55 and thence to the associated Cache Address Buffers(CAB) 60, 64 of Cache memories 62, 66, respectively. Priority Network 50 then performs the Priority determination upon the Priority Request signals coupled to the associated lines of cable 52, the output of which is an active signal, coupled to one of the lines of the cable 68, that is representative of the honoring of the Priority Request signal of one of the requesting Requestors.

Upon the Priority determination of the one Priority Request Signal that is to be granted priority, Priority Network 50 generates an Initiate, which via line 70, initiates a timing chain in Requestor Controller (RC) 72. Concurrent with the Priority determination by Priority Network 50, the Cache memories 62, 66 perform the Match determination in Cache Address Buffers 60, 64, respectively, whereby the Requestor addressess that are held in the Requestor Address Registers 54, 55 are compared to the Requestor addresses that are stored in Cache Address Buffers 60, 64, respectively. Cache Address Buffers 60, 64 during the Match determinations determine if: a Match condition exists, i.e., that the Requestor addresses in Requestor Address Registers 54, 55 match a Requestor Address previously stored in Cache Address Buffers 60, 64, or, alternatively; a $\overline{\text{Match}}$ condition exists, i.e., that the Requestor addresses in Requestor Address Registers 54, 55 do not match a Requestor Address previously stored in Cache Address Buffers 60, 64.

In the configuration of FIG. 5, there are utilized R Cache memories 62, 66 (where R = 8, but only Cache Memories R$\phi$ and R7 and are illustrated for the sake of brevity) wherein the same Requestor addresses and the same associated data are stored in Cache memories 62, 66. Accordingly, the signal on the one activated line of cable 68 that identifies the one requesting Requestor that is to be granted priority by the Priority Network 50, is utilized as an enabling signal at the one associated Read Data Register 77, 80 such that although multiple Matches may be determined in the 8 Cache memories 60, 62, only that Read Data from the Cache Data Buffer 61, 65 that is associated with the one requesting Requestor that is to be granted priority by Priority Network 50, is gated into and out of the one associated Read Data Register 77, 80.

As an example, if Requestor R$\phi$ is to granted priority, its active signal on line 67 of cable 68 is an enabling signal at AND gates 75, 76, via line 67a, and at Read Data Register 77, via line 67b, all associated with R$\phi$ Cache memory 62. If a Match determination is made in Cache Address Buffer 60, the Match signal on line 70, the active signal on line 67a, and the Initiate Acknowledge signal on line 72a from Requestor Controller 72 enable AND gate 75 to generate and couple an Acknowledge R$\phi$ signal to line 75a and thence to Requestor R$\phi$ while the Match signal on line 70a, the active signal on line 67b, and the Load Data Register signal on line 72b, from Requestor Controller 72, enable the data read out of Cache Data Buffer 61, via line 61a, to be gated into and out of Read Data Register 77.

If during the Match determination by Cache Address Buffers 60, 64, a Match condition is determined by Cache Address Buffer 60, while concurrently Priority Network 50 determines that Requestor R$\phi$ is to granted priority, Cache Address Buffer 60 generates a Match signal, which via line 70 and the one activated line of cable 68, gates: the associated read data out of the associated content addressable location in Cache Data Buffer (CDB) 61 of Cache memory 62 and into and out of the associated Read Data Register (RDR) 77; and, the associated Acknowledge signal into and out of the associated Acknowledge AND gate 75.

If instead of the determination of a Match condition, a $\overline{\text{Match}}$ condition is determined, while concurrently, Priority Network 50 determines that Requestor R$\phi$ is to be granted priority, Cache Address Buffer 60 generates and couples a $\overline{\text{Match}}$ signal to line 80. The $\overline{\text{Match}}$ signal on line 80, the active signal on the one activated line 67 of cable 68, and the Initiate Acknowledge signal, via line 72a, from Requestor Controller 72, enable AND gate 76 coupling a $\overline{\text{Match}}$ signal, via line 84, to OR gate 86. The $\overline{\text{Match}}$ or Miss signal, via line 88, causes Cache Memory Controller (BC) 90 to generate the necessary signals that retrieve the sought for data that is stored in the associated address of Main memory, writes the retrieved address and the associated data into the associated portions of Cache Address Buffers 60, 64 and Cache Data Buffers 61, 65 respectively, and reinitiates the Requestor Controller 72 to repeat the Match determination in Cache memory 62—the sought for address and the associated data now being stored or resident in Cache memory 62. FIGS. 6 and 7 graphically illustrate that the time required to perform the Priority determination and the time to perform the Match determination are not cumulative or additive providing a minimum optimum memory access time as compared to the longer than optimum memory access time exemplified by the prior art configuration of FIGS. 2, 3 and 4.

What is claimed is:

1. In an electronic data processing system, including a plurality of requestors that seek access to data stored in a like plurality of cache memories, the combination comprising:

R cache memories, each comprising:
a buffer memory having a plurality of address memory locations and a like plurality of associated data memory locations for storing a requestor address in each of said address memory locations and associated data in the associated data memory location; and,
match determining means coupled to said address memory locations;

R requestors having a priority range, each generating an associated requesting requestor address and an associated priority request signal;

priority determining means;

means separately coupling each of said priority request signals from each separate one of said R requestors to said priority determining means for determining which one of the priority request signals generated by the requesting requestors is to be granted priority over the other ones of said requesting requestors and generating a requestor active signal indicative of the one requesting requestor that is to be granted priority;

R gating means;

means coupling each of said gating means to only a separate associated one of said R cache memories for receiving the data that are read out of the associated cache memory;

means coupling said requestor active signal from said priority determining means to only the separate associated one of said R gating means for enabling the data that were read out of the associated one of said R cache memories to be coupled to the requesting requestor that was granted priority by said priority determining means;

means coupling the requesting requestor address from each of said R requestors to only an associated separate one of said R cache memories; and, timing means simultaneously coupling said priority request signals to said priority determining means and each of said requesting requestor addresses to the associated cache memory for simultaneously initiating said priority determination and said match determination.

2. In an electronic data processing system including R requestors, each of which seeks access to data stored in a separate associated one of R cache memories, the combination comprising:

R cache memories, each comprising:
a buffer memory having a plurality of addressable requestor address locations and a like plurality of associated data locations for storing a requestor address in each of said addressable requestor address locations and associated data in the associated one of said data locations; and,
match determining means coupled to said addressable requestor address locations;

R requestors having a priority range, each generating an associated requesting requestor address and an associated priority request signal;

priority determining means;

R read data registers;

means coupling each of said R read data registers to only a separate associated one of said R cache memories for receiving the data read out of the associated data locations;

means including R requestor address register means separately coupling each of said requesting requestor addresses from each separate one of said R requestors to only an associated one of said R cache memories for comparing a requesting requestor address with the requestor addresses that are stored in the addressable requestor address locations thereof and if said requesting requestor address matches one of the requestor addresses that are stored in said addressable requestor address locations gating out the associated data that are stored in the data location that is associated with the requestor address that is stored in the associated one of said addressable requestor address locations and that matched said requesting requestor address;

means separately coupling each of said priority request signals from each separate one of said R requestors to said priority determining means for determining which one of the priority request signals generated by the requesting requestors of said R requestors is to be granted priority over the other ones of said requesting requestors and generating a requestor active signal indicative of the one requesting requestor that is to be granted priority;

means coupling said requestor active signal from said priority determining means to only the separate associated one of said R read data registers for enabling the data that are read out of the associated one of said R cache memories to be coupled to only the separate associated one of said R read data registers;

timing means for generating a clocking signal; and, means coupling said timing means clocking signal to said priority determining means and to said R requestor address register means for simultaneously initiating said priority determination by said priority determining means and said match determination by said match determining means in all of said R cache memories.

3. In an electronic data processing system including R requestors, each of which seeks access to data stored in a separate associated one of R cache memories, the combination comprising:

R requestors having a priority range, each generating an associated requesting requestor address and an associated priority request signal;

R cache memories comprising, an address buffer having a plurality of address locations for storing a like plurality of requestor addresses;

a data buffer having a plurality of data locations, each one of which is associated with only an associated one of said plurality of address locations in said address buffer, for storing data that are associated with the requestor address that is stored in said associated address location;

match determining means for comparing a requesting requestor address with the requestor addresses that are stored in said address locations in said address buffer and generating a Match signal if said requesting requestor address matches one of the requestor addresses that are stored in said address locations; and, means responsively coupled to said Match signal for reading out the data that are stored in the data location that is associated with the address location in which is stored the requestor address that matches said requesting requestor address;

means coupling the requesting requestor address from each of said R requestors to only the associated one of said R cache memories;

priority determining means;

means coupling the priority request signal from each of said R requestors to said priority determining means for determining which one of the priority request signals generated by the requesting requestors of said R requestors is to be granted priority over the other ones of said requesting requestors and generating a priority active signal that is indicative thereof;

timing means for simultaneously initiating said priority determination by said priority determining means and said match determination by each of said match determining means in each of said R cache memories;

R data gating means;

means coupling each of said R data gating means to only a separate associated one of said R cache memories for coupling the data that are read out of the associated one of said R cache memories to the separate associated one of said R data gating means;

means coupling each of said R data gating means to only the separate associated one of said R requestors; and, means coupling said requestor active signal from said priority determining means to only the separate associated one of said R gating means for gating the data that are read out of the associated one of said R cache memories to the separate associated one of said R requestors.

* * * * *